July 12, 1966  A. H. TESSMANN  3,259,969
METHOD OF MAKING BUTT WELDED JOINTS
Filed Jan. 22, 1963
FIG. 1
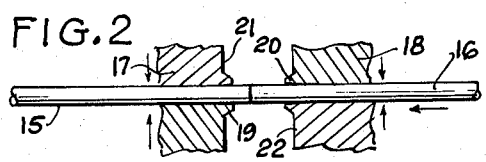
FIG. 2
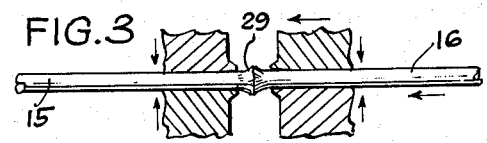
FIG. 3
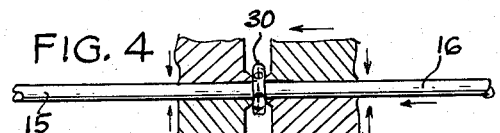
FIG. 4
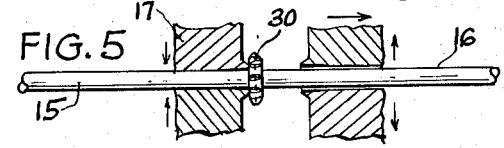
FIG. 5
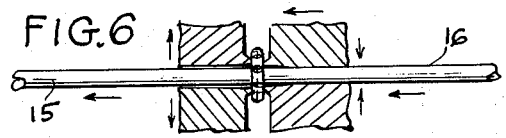
FIG. 6
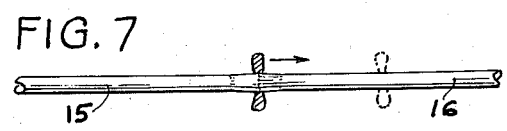
FIG. 7
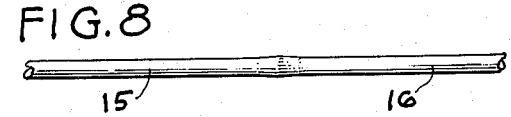
FIG. 8
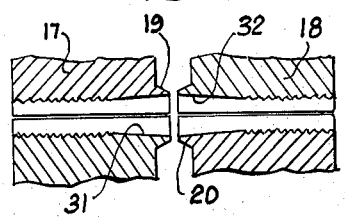
FIG. 1A
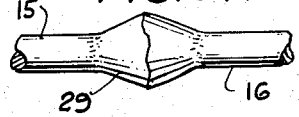
FIG. 3A
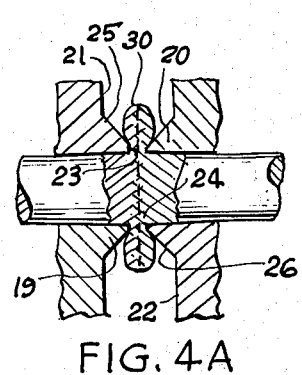
FIG. 4A
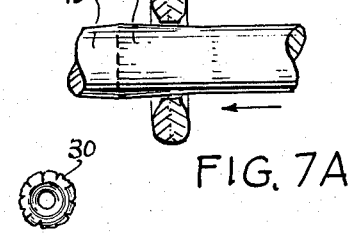
FIG. 7A
FIG. 9
INVENTOR.
ALFRED H. TESSMANN
BY Horton, Davis,
Brewer & Brugman
ATTYS

United States Patent Office 3,259,969
Patented July 12, 1966

3,259,969
METHOD OF MAKING BUTT WELDED JOINTS
Alfred H. Tessmann, Atlanta, Ga. (% Central Cable Corp., 1901 Montreal Road, P.O. Box 595, Tucker, Ga.)
Filed Jan. 22, 1963, Ser. No. 253,123
1 Claim. (Cl. 29—487)

This invention relates to a method of making butt welded joints, and it is particularly well adapted for use with materials which have the characteristic of hardening when worked. Typical of such materials are aluminum, copper and stainless steel, each of which is extensively used in industry. For purposes of illustration, the invention will be described with reference to its application to a method of butt welding lengths of wire made of such work hardenable material, but its scope is not limited to this specific shape of article.

In the manufacture of wire made from aluminum or other work hardenable material, it is desirable to form the wire in a continuous length of a predetermined dimension. Such lengths are wound on a spool for sale to the public, and each spool must contain a continuous length of the size specified on the spool label. The wire, however, is made from bar stock which does not always produce the desired wire length, or which produces one or more full lengths with a fraction left over. The remaining fraction represents a loss unless it can be united with another fractional length of wire to make a full spool.

In the past it has been customary to join several lengths of wire by joints made by the butt welding process. In this process two prepared ends of adjacent lengths of wire are pressed together in a resistance welding apparatus which melts the abutting ends to unite them and form the weld.

When the weld is completed, the joint is allowed to cool. The heating to welding temperature, followed by a gradual cooling results in an annealing of the wire at the weld which reduces materially the tensile strength of the weld. This, in turn, detracts from the value of the entire spool of wire.

In addition to forming the weld, however, the pressure required for the weld causes an upsetting of the melted material in the joint and results in an enlargement of the wire diameter at that point. This enlargement is reduced by hand filing or grinding, neither one of which affects the tensile strength of the joint.

The problem thus is two-fold, that of restoring the tensile strength of the material at the joint to that of the wire before welding, and that of restoring the upset region at the weld to a uniform shape having approximately the same diameter as the wire before welding.

The present invention solves both problems as to certain materials by making use of a common characteristic of such materials, viz, the ability of such materials to harden when they are bent, compressed or otherwise strained beyond their elastic limits. This characteristic is commonly known as "work hardening." According to the present invention the reshaping of the upset joint to restore it to the original wire dimension is made to cause the material at the weld to work harden and thus to increase its tensile strength.

It is an object of this invention to provide a method of butt welding joints in metallic stock capable of work hardening, which method will result in a joint having substantially the same tensile strength as the material at either side of the joint.

For another object, this invention seeks to provide a method of producing a butt welded joint in a wire or the like wherein said method incorporates a means for restoring the material of the weld to substantially the same tensile strength as the wire itself.

As a more specific object, this invention has within its purview the provision of a method of joining together two sections of wire of work hardenable material by a known butt welding process which produces an upset region at the joint, and then removing the excess material at the joint while at the same time work hardening the material of the joint to bring its tensile strength up to that of the wire at either side of the joint.

These and other objects of this invention will become apparent from the following detailed description when taken together with the accompanying drawings in which:

FIG. 1 shows the end regions of two pieces of wire which are to be united by a butt welding process;

FIG. 1A is an axial section on an enlarged scale of the chucks used in the process of this invention;

FIG. 2 shows the two pieces of wire, each held in a chuck, and the two pieces pressed together prior to the application of the electric current for resistance welding the two ends together;

FIG. 3 shows the two pieces of wire of FIG. 2 after the electric current has been applied to the joint and the joint itself has been heated to welding temperature and upset in the process;

FIG. 3A is an enlarged view of the upset joint of FIG. 3;

FIG. 4 shows the joint of FIG. 3 after the joint is operated upon to reshape it;

FIG. 4A is an enlarged view in section of the joint of FIG. 4;

FIG. 5 shows the joint of FIG. 4 with one of the dies removed therefrom preparatory to severing the excess material from the reshaped joint;

FIG. 6 shows the joint after the excess material has been severed;

FIG. 7 shows the joint with the excess material loose on the wire and the holding dies removed;

FIG. 7A is an enlarged sectional view of the severed excess material;

FIG. 8 shows the wire after the ends have been joined by this process; and

FIG. 9 shows an end elevational view of the excess material after it has been removed from the wire.

According to generally accepted commercial methods, wire may be formed from a bar of the selected material which may be of varying dimensions. Such bars are generally rolled at controlled temperatures through progressive reductions until the desired diameter of rod is attained. The rod is then cold drawn through progressively smaller dies to produce the desired diameter of wire. Under most circumstances, one such bar is sufficient to produce a continuous length of spooled wire. It may occur, however, that the remnant from one bar is not sufficient to fill a spool of the desired length and hence that remnant of wire must either be discarded, or alternatively joined to the wire formed from the next bar to provide the necessary length to fill a spool. Since discarding the remnant represents waste of material, it is preferable to join the remnant to another section to form a complete length. It may be appreciated that the frequency with which a joint is to be made is not very high and hence the apparatus selected to form the joint need not be of a high speed automatic type. In fact, it has been found that relatively simple known wire holding chucks modified as described below and operated through cams from a lever manually operated may suffice for this purpose.

Assuming that a condition arises in a wire drawing mill which requires the joining of two sections of wire together, said two sections may be brought into juxtaposition in the manner shown in FIG. 1 and threaded through appropriate chucks so that the ends may be firmly held in the succeeding welding process. Thus, in FIG. 1 the two sections of wire are shown at 15 and 16, respectively, and in FIG. 2 the said sections are shown firmly held in chucks 17 and 18.

Each said chuck 17 and 18, although substantially standard in general form and operation, is modified in that it has a nose 19 and 20, respectively, (FIGS. 1A and 4A) extending axially from the adjoining faces 21, 22, respectively, of said chucks, said nose in each case resembling a circular flange which is in contact at its inner periphery with the wire extending through the chucks.

Each nose 19 and 20 has a narrow flat radially disposed face 23, 24 and a radially outwardly sloping, substantially conical face 25, 26 connecting the narrow flat faces with the faces 21 and 22, respectively, of the chucks. The wire-receiving opening in each chuck is tapered at approximately 2° for a distance equal to approximately two diameters of the wire from the end of the wire as shown at 31 and 32. This leaves approximately two-thirds of the axial length of a chuck for gripping a wire. This two-thirds is preferably serrated in a peripheral direction to provide better gripping of the wire. The taper allows a slight expansion of the wire in the subsequent hardening operation, in a manner to increase the tensile strength of the wire by work hardening to compensate for the temperature gradient produced by the welding.

Chucks 17 and 18 and the ends of the wires 15 and 16 clamped therein are brought toward one another by an appropriate movement of the welding apparatus until the ends 27 and 28 of the wire are in abutting relation as shown in FIG. 2. Next, current is passed through the wire in accordance with known resistance welding procedures while, at the same time, chuck 17 is held firmly against axial movement and chuck 18 is subjected to an appropriate axially directed force tending to urge said chuck 18 toward chuck 17. As the resistance welding process proceeds, the abutting ends of the wire become heated to a welding temperature at which they become plastic, and with the continuous pressure applied to the abutting ends by chuck 18, the now plastic material at the joint will be upset to form a bulbous region 29 (FIG. 3A), having its greatest diameter at the welded ends of the wire.

The usual butt welding process employed for joining sections of wire together terminates at this point. The chucks are removed and the upset region 29 is then filed down to approximately the diameter of the wire itself. The filing operation is usually done by hand and is necessarily somewhat crude in that the surface of the wire may contain flat spots and other departures from the desired cylindrical contour. The upset region itself, having been heated and then cooled gradually, is annealed and therefore softer than the remaining portions of the wire which have been wire drawn and accordingly somewhat hardened in passing successively through the dies. Thus, the resulting joint, according to the old process, is non-uniform as to diameter, which may interfere with various forming and coating operations to be performed subsequently on the wire by the ultimate purchaser thereof, and the wire as a whole cannot be subjected to a tensile force greater than that which the annealed, softer material of the joint is capable of withstanding. The annealing is greatest where the temperature is the highest, i.e., at the weld, but the heat of the weld is conducted back along the wire away from the weld a short distance so that the annealing tapers off gradually beyond the weld.

According to this invention the tensile strength of the material at the welded joint and adjacent thereto is increased to a value approximately or even higher than that which the wire had prior to the welding operation, and excess material at the joint is removed in a manner to leave a smooth, round surface thereat substantially identical with the surface of the original wire. The first step, according to this invention, is illustrated in FIGS. 4 and 4A and comprises bringing chucks 17 and 18 closer together while clamped to their respective wire sections until the chucks are separated by a relatively thin flash. During the movement toward one another, the bulbous region 29 of the joint is contacted by the noses 23 and 24 of the chucks 17 and 18 and is physically squeezed together or "worked" while the material is relatively cool. As the bulbous region is squeezed, the material thereat tends to move radially outwardly along the sloping surfaces 25 and 26, and it will move also radially inwardly around the inner corner regions of the noses 23 and 24 toward the center of the wire and into the tapered regions 31 and 32 of chucks 17 and 18. The greater portion of the bulbous region will, of course, move radially outwardly to form a doughnut 30 having approximately the form shown in FIG. 9, i.e., the outer edges of the moved metal may be serrated or cracked because of the excessive tensile forces impressed thereon by the expansion or extension of the material radially outwardly from between the chucks. The 2° taper in the openings of the chucks allows the material to be worked to a gradually diminishing degree from the weld to the portion of the wire which has not been affected by the heat of the welding operation.

After chucks 17 and 18 are brought closer together, as shown in FIGS. 4 and 4A, chuck 18 is loosened and moved back away from chuck 17 a distance approximately equal to two diameters of the wire. The loosened and removed chuck 18 is shown in FIG. 5. Chuck 18 is then reclamped on wire 16 at its new location, and chuck 17 is loosened from wire section 16 but held against axial movement and, by an appropriate operation of the welding apparatus, reclamped chuck 18 and the wire held thereby are moved toward loosened chuck 17. Since chuck 17 at the start of the axial movement of the wire is in abutting relation to the doughnut 30, the axial movement of chuck 18 and the wire held thereby toward the axially held chuck 17 results in a shearing of the doughnut 30 from the welded region of the wire and in a displacement of the doughnut to a position in abutting relation to chuck 18. The displaced doughnut 30 is shown more clearly in FIG. 7A. The diameter of the clamping portion of chuck 17 when shearing doughnut 30 is large enough to pass over the slight bulge formed in the wire by the tapers 31 and 32 in chucks 17 and 18. The shearing of doughnut 30 by the chuck leaves a smooth surface on the wire at the weld, the diameter of which is only slightly larger than that of the wire adjoining the weld, and no further filing or other manual shaping of the welded joint is required.

The loosened doughnut 30 may be readily snipped off from the wire and the substantially invisible joint between the wire sections 15, 16 is now complete.

The working of the material by squeezing and upsetting it and then shearing it results in a hardening of the material at the joint which raises the tensile strength of the material thereat from that of an annealed material to that of the wire at the joint before it is subjected to the resistance welding process. Thus, the step of restoring the wire at the joint to its initial diameter performs two functions at the same time and results in a smooth joint having substantially the same tensile strength as the remainder of the wire.

The requisite relative movements of the chucks 17 and 18 can be brought about by any suitable known mechanical devices and it is therefore immaterial to the invention whether chuck 17 is axially fixed and chuck 18 is axially movable, or vice versa, or whether both are axially movable.

The method of this invention is applicable to the butt welding of any material which possesses the characteristic of work hardening, and it is applicable to diverse shapes of wire, rods, etc. made from such material. I have found in one typical example of a wire of high purity aluminum that whereas a joint butt welded according to the prior art method will yield at approximately 11,500 p.s.i., a joint in wire of the same material and diameter made according to this invention will not yield until stressed to approximately 25,000 p.s.i.

It is understood that the foregoing description is merely illustrative of a preferred embodiment of this invention and that the scope of the invention therefore is not to be limited thereto, but is to be determined by the appended claim.

I claim:

The method of forming a butt welded joint of first and second sections of wire made of work-hardenable material, said method comprising bringing the two sections of wire together with their ends in abutting relation to one another, holding the first said section in a stationary chuck while holding the second said section in an axially movable chuck, heating the abutting ends of the wire until plastic and simultaneously moving the movable chuck and the second section held therein toward the first section to unite said sections of wire, said second section of wire, while it is moving toward the first section, causing the plastic material at the abutting ends to move outwardly of the axis of the wire to form an upset region at the joint, allowing the upset region to cool, the heating and subsequent cooling steps resulting in an annealing of the upset region which lowers the tensile strength at the joint below that of the remainder of the wire, and working the region at the end adjacent to the joint by moving said chucks and the wire sections held therein toward one another to strain the material of the weld and the annealed material adjacent thereto, the movement of said chucks and wire sections held therein toward one another continuing until the chucks contact and compress between them the upset region at the joint, the method comprising the further steps of limiting the contact between the chucks and upset region to a narrow band located adjacent the surface of the wire whereby to form a thin membrane at the surface of the wire, releasing one of said chucks, moving said released chuck away from the membrane and reclamping said moved chuck to the wire, releasing the other of said chucks and then sliding the reclamped chuck and wire toward the released chuck, thereby shearing the said membrane from the joint in the wire and restoring the upset region to substantially the original cylindrical form and diameter of the wire.

References Cited by the Examiner

UNITED STATES PATENTS

| | | | |
|---|---|---|---|
| 2,231,317 | 2/1941 | Bernard | 219—100 X |
| 2,756,358 | 7/1956 | Johnson | 219—100 X |
| 2,877,337 | 3/1959 | Evans | 219—97 |
| 2,945,117 | 7/1960 | Harris et al. | 219—97 |

JOHN F. CAMPBELL, *Primary Examiner.*

P. M. COHEN, *Assistant Examiner.*